(12) United States Patent
Guidotti et al.

(10) Patent No.: US 11,466,107 B2
(45) Date of Patent: Oct. 11, 2022

(54) COMPONENTS AND CATALYSTS FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Dario Liguori, Ferrara (IT); Giampiero Morini, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 99 days.

(21) Appl. No.: 16/967,587

(22) PCT Filed: Jan. 25, 2019

(86) PCT No.: PCT/EP2019/051886

§ 371 (c)(1),
(2) Date: Aug. 5, 2020

(87) PCT Pub. No.: WO2019/149636

PCT Pub. Date: Aug. 8, 2019

(65) Prior Publication Data

US 2021/0269564 A1   Sep. 2, 2021

(30) Foreign Application Priority Data

Feb. 5, 2018  (EP) .................... 18155138

(51) Int. Cl.
*C08F 4/02*       (2006.01)
*C08F 4/20*       (2006.01)
*C08F 4/646*      (2006.01)
*C08F 110/06*     (2006.01)
*C08F 4/657*      (2006.01)

(52) U.S. Cl.
CPC ............ *C08F 110/06* (2013.01); *C08F 4/022* (2013.01); *C08F 4/20* (2013.01); *C08F 4/646* (2013.01); *C08F 4/6574* (2013.01); *C08F 2410/03* (2013.01)

(58) Field of Classification Search
CPC .......... C08F 4/20; C08F 4/646; C08F 110/06
See application file for complete search history.

(56) References Cited

U.S. PATENT DOCUMENTS

| | | | |
|---|---|---|---|
| 4,952,649 | A | 8/1990 | Kioka et al. |
| 6,034,189 | A | 3/2000 | Shinozaki et al. |
| 6,521,560 | B1 | 2/2003 | Kojoh et al. |
| 7,019,097 | B2 | 3/2006 | Sacchetti et al. |

FOREIGN PATENT DOCUMENTS

| | | | | |
|---|---|---|---|---|
| CN | 105985464 A | 10/2016 | | |
| JP | H06009722 A | 1/1994 | | |
| JP | H08034813 A | 2/1996 | | |
| JP | H09031119 A | 2/1997 | | |
| WO | WO-9844009 A1 * | 10/1998 | ............ | B01J 27/138 |
| WO | 2004024785 A1 | 3/2004 | | |
| WO | 2015135903 A1 | 9/2015 | | |
| WO | WO-2015169652 A1 * | 11/2015 | .............. | C08L 23/12 |
| WO | 2017042054 A1 | 3/2017 | | |
| WO | 2017042058 A1 | 3/2017 | | |

OTHER PUBLICATIONS

International Search Report and Written Opinion dated May 13, 2019 (May 13, 2019) for Corresponding PCT/EP2019/051886).

* cited by examiner

*Primary Examiner* — Catherine S Branch

(57) ABSTRACT

A solid catalyst component for the polymerization of olefins $CH_2=CHR$, wherein R is hydrogen or a hydrocarbon radical with 1-12 carbon atoms, made from or containing Mg, Ti, Bi, a halogen and an electron donor.

14 Claims, No Drawings

COMPONENTS AND CATALYSTS FOR THE POLYMERIZATION OF OLEFINS

This application is the U.S. National Phase of PCT International Application PCT/EP2019/051886, filed Jan. 25, 2019, claiming benefit of priority to European Patent Application No. 18155138.3, filed Feb. 5, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a catalyst component for the polymerization of olefins, to the catalyst obtained therefrom and to the use of the catalysts in the polymerization of olefins $CH_2=CHR$ wherein R is hydrogen or a hydrocarbyl radical with 1-12 carbon atoms.

BACKGROUND OF THE INVENTION

In some instances, high-yield Ziegler-Natta catalyst components for the polymerization of olefins are obtained by supporting, on a magnesium dihalide, a titanium compound and an electron donor compound as a selectivity control agent. In some instances, the olefins include propylene. In some instances, the catalyst components are used with an aluminum alkyl and, optionally, another electron donor (external) compound in the stereospecific polymerization of propylene.

In some instances, the catalyst components are employed in different polymerization techniques depending on the average particle size of the catalyst components. In some instances, small particle size catalyst components are used in slurry or bulk polymerization techniques while large size catalyst are used for gas-phase polymerization reactors.

SUMMARY OF THE INVENTION

In a general embodiment, the present disclosure provides a solid catalyst component for the polymerization or copolymerization of olefins made from or containing titanium, bismuth, magnesium, a halogen, and an electron donor compound and obtained by a process including the following steps:
(a) dissolving a magnesium halide in a solvent system made from or containing an electron donor compound and a liquid hydrocarbon at a temperature higher than 40° C., thereby yielding a solution;
(b) cooling the solution to a temperature below 40° C. and adding a titanium compound in a molar excess with respect to the magnesium halide;
(c) raising the temperature of the solution to higher than 70° C., thereby obtaining a solid product; and
(d) treating the solid product obtained in step (c) with an excess of titanium halide at a temperature higher than 80° C. for one or more times and recovering the solid particles of catalyst component, wherein
  (i) a bidentate electron donor compound is present in step (c), step (d), or both steps (c) and (d) and
  (ii) a Bi compound is present in one or more of steps (a)-(d).

As used herein, the term "halide of magnesium" includes magnesium dihalides, complexes of magnesium dihalide with a Lewis base, and derivatives of magnesium halide. In some embodiments, magnesium dihalides are selected from the group consisting of magnesium dichloride, magnesium dibromide and magnesium diiodide. In some embodiments, the magnesium halide is magnesium dichloride. In some embodiments, the Lewis base is water or alcohol. In some embodiments, the derivatives of magnesium halide have a halogen atom substituted with a hydrocarboxyl or halohydrocarboxyl group.

In some embodiments, the electron donor compounds capable of dissolving the magnesium compound are selected from the group consisting of alcohols, aldehydes, amines, organic carboxylic acids, anhydrides, ethers, organic epoxy compounds, organic phosphorous compounds, and mixtures thereof.

In some embodiments, the electron donor compound or mixture is employed in an equimolar amount or molar excess with respect to Mg.

In some embodiments and when dissolving a halogen-containing magnesium compound in a hydrocarbon solvent using an alcohol as an electron donor, the alcohol is used in an amount of at least about 1 mole, alternatively about 1 to about 20 moles, alternatively about 1.5 to about 12 moles, per mole of the halogen-containing magnesium compound. In some embodiments, an aliphatic hydrocarbon or an alicyclic hydrocarbon is used as the hydrocarbon solvent.

It is believed that there is no upper limit to the amount of the alcohols used. In some embodiments, the amount of the alcohol is not more than about 40 moles, alternatively not more than about 20 moles, alternatively not more than 10 moles, per mole of the magnesium compound.

In some embodiments, the alcohols have at least 6 carbon atoms, alternatively 6 to 20 carbon atoms. In some embodiments, the alcohols are selected from the group consisting of aliphatic alcohols, alicyclic alcohols, aromatic alcohols, and aliphatic alcohols containing an alkoxy group. In some embodiments, the aliphatic alcohols are selected from the group consisting of 2-methylpentanol, 2-ethylbutanol, n-heptanol, n-octanol, 2-ethylhexanol, decanol, dodecanol, tetradecyl alcohol, undecanol, oleyl alcohol and stearyl alcohol. In some embodiments, the alicyclic alcohols are selected from the group consisting of cyclohexanol and methyl cyclohexanol. In some embodiments, the aromatic alcohols are selected from the group consisting of benzyl alcohol, methylbenzyl alcohol, isopropylbenzyl alcohol, α-methylbenzyl alcohol and α,α-dimethylbenzyl alcohol. In some embodiments, the aliphatic alcohols containing an alkoxy group are selected from the group consisting of ethylene glycol mono-n-butyl ether and i-butoxy-2-propanol.

In some embodiments, the alcohols are used alone, in mixtures, or in mixtures with alcohols having 5 or less carbon atoms with the indicated molar ratio. In some embodiments and when alcohols having 5 or less carbon atoms are used, the total amount of the alcohols is at least about 15 moles per mole of the halogen-containing magnesium compound.

In some embodiments and when an aromatic hydrocarbon is used as the hydrocarbon solvent, the halogen-containing magnesium compound is solubilized by using the alcohols in an amount of about 1 to about 20 moles, alternatively about 1.5 to about 12 moles.

In some embodiments, dissolution of the halogen-containing magnesium compound in the solvent system starts at room temperature or at higher temperatures and the temperature is raised to at least 40° C., alternatively at least 45° C., alternatively from 50 to 300° C., alternatively from 100 to about 200° C. In some embodiments, the dissolution time is from a period of 15 minutes to 5 hours, alternatively from 30 minutes to 2 hours.

In some embodiments, other electron donor compounds or mixtures are used to dissolve the magnesium compound.

In some embodiments, organic epoxy compounds are selected from the group consisting of oxides of aliphatic olefins, aliphatic diolefins, halogenated aliphatic olefins, and halogenated aliphatic diolefins, glycidyl ethers, cyclic ethers and the like having 2-8 carbon atoms. In some embodiments, organic epoxy compounds are selected from the group consisting of ethylene oxide, propylene oxide, butylene oxide, butadiene dioxide, epoxy chloropropane, methylglycidyl ether, diglycidyl ether, tetrahydrofuran, and the like.

In some embodiments, organic phosphorous compounds are organic esters of phosphoric acids. In some embodiments, the organic esters of phosphoric acids are selected from the group consisting of trimethyl phosphate, triethyl phosphate, tributyl phosphate, and triphenyl phosphate. In some embodiments, the organic esters of phosphoric acids are selected from the group consisting of trimethyl phosphate, triethyl phosphate and tributyl phosphate. In some embodiments, the organic ester of phosphoric acids is tributyl phosphate.

In some embodiments, the carboxylic acids include organic carboxylic acids having at least 7, alternatively 7 to 20, carbon atoms. In some embodiments, the carboxylic acids include organic carboxylic acids are selected from the group consisting of caprylic acid, 2-ethylhexanoic acid, undecylenic acid, undecanoic acid, nonylic acid and octanoic acid.

In some embodiments, the aldehydes have at least 7, alternatively 7 to 18, carbon atoms. In some embodiments, the aldehydes are selected from the group consisting of capric aldehyde, 2-ethylhexyl aldehyde, caprylaldehyde and undecylic aldehyde.

In some embodiments, the amines have at least 6, alternatively 6 to 18, carbon atoms. In some embodiments, the amines are selected from the group consisting of heptylamine, octylamine, nonylamine, decylamine, laurylamine, undecylamine and 2-ethylhexylamine.

In some embodiments, the amounts and temperatures for dissolution with alcohols are used with carboxylic acids, aldehydes, amines and ethers. In some embodiments, the solvent system is made from or containing an electron donor compound selected from the group consisting of aliphatic alcohols having at least 6 carbon atoms, organic epoxy compounds, organic esters of phosphoric acids and mixtures thereof.

In some embodiments, the liquid hydrocarbons for use in step (a) are selected from the group consisting of aliphatic hydrocarbons, alicyclic hydrocarbons, aromatic hydrocarbons, and halogenated hydrocarbons. In some embodiments, the aliphatic hydrocarbons are selected from the group consisting of pentane, hexane, heptane, octane, decane, dodecane, tetradecane and kerosene. In some embodiments, the alicyclic hydrocarbons are selected from the group consisting of cyclopentane, methylcyclopentane, cyclohexane, methylcyclohexane, cyclooctane and cyclohexene. In some embodiments, the aromatic hydrocarbons are selected from the group consisting of benzene, toluene, xylene, ethylbenzene, cumene and cymene. In some embodiments, the halogenated hydrocarbons are selected from the group consisting of dichloroethane, dichloropropane, trichloroethylene, carbon tetrachloride and chlorobenzene.

In some embodiments and after dissolution of the magnesium halide, the solvent system is added with a further solvent modifying compound. In some embodiments, the further solvent-modifying compound is selected from the group consisting of dicarboxylic acid anhydrides. In some embodiments, the dicarboxylic acid anhydrides are aromatic dicarboxylic acid anhydrides. In some embodiments, the dicarboxylic acid anhydride is phthalic anhydride. In some embodiments, the solvent-modifying compound is used in a lower molar amount with respect to the main electron donor compound. In some embodiments, the further solvent-modifying compound is added in step (a) and before step (b).

In some embodiments, in step (b), and after cooling the solution at a temperature lower than 40° C., alternatively lower than 35° C., alternatively lower than 30° C., a Ti compound is added.

In some embodiments, the titanium compound used in step (b) is a compound having the formula $TiX_n(OR)_{4-n}$ wherein X is a halogen, each R is independently a hydrocarbyl group and n is an integer of from 2 to 4. In some embodiments, the halogen is chlorine. In some embodiments, the titanium compounds are selected from the group consisting of titanium tetrachloride, titanium tetrabromide, titanium tetraiodide, dichlorodiethoxy titanium, trichloroethoxy titanium and the like. In some embodiments, a liquid titanium compound is used. In some embodiments, $TiCl_4$ is used. In some embodiments, the titanium compound is used in a molar excess with respect to the Mg compound, alternatively in a Ti/Mg molar ratio of 3 or higher, alternatively higher than 5.

In some embodiments and after addition of the Ti compound, the temperature is raised again to 70° C. or higher. In some embodiments, the temperature is brought in the range 90-135° C., alternatively 100-120° C.

In some embodiments and in this stage of the process, formation of a solid precipitate starts occurring. In some embodiments and at the end of this process stage, the resulting solid particles are separable from the liquid phase.

In some embodiments, precipitation of solid particles takes place in step (c). In some embodiments and when an auxiliary electron donor compound is used in step (a), the morphology of the solid particles is uniform and regular.

In some embodiments and when the temperature in step (c) is slowly raised, particles of regular morphology are obtained. In some embodiments, the rate of temperature increase ranges from about 4° C. to about 100° C. per hour.

In some embodiments and at this stage of the process, a bidentate electron donor compound is contacted with the generated solid particles. In some embodiments, the bidentate donor is added to the total reaction mixture of step (c). In some embodiments, the bidentate donor is added to the solid particles separated from the liquid phase. In some embodiments, the solid precipitate is separated from the liquid phase by filtration, centrifugation or siphoning of the liquid phase after the solid is settled.

In some embodiments, the bidentate electron donor compound is selected from the group consisting of ethers, amines, alkoxysilanes, carbamates, ketones, and esters of aliphatic or aromatic mono- or polycarboxylic acids.

In some embodiments, the esters are selected from the group consisting of alkyl and aryl esters of optionally substituted aromatic polycarboxylic acids and esters of aliphatic acids. In some embodiments, the esters are esters of phthalic acids. In some embodiments, the aliphatic acids for making the esters are selected from the group consisting of malonic, glutaric, maleic and succinic acids. In some embodiments, the esters are selected from the group consisting of n-butylphthalate, di-isobutylphthalate and di-n-octylphthalate. In some embodiments, the esters are selected from diesters described in Patent Cooperation Treaty Publication No. WO2010/078494 and U.S. Pat. No. 7,388,061. In some embodiments, the esters are selected from the group consisting of 2,4-pentanediol dibenzoate derivatives and 3-methyl-5-t-butyl catechol dibenzoates. In some embodiments, the internal donor is a diol derivative. In some embodiments, the diol derivative is selected from the group consisting of dicarbamates, monoesters monocarbamates and monoesters monocarbonates.

In some embodiments, the ethers are selected from the group of the 1,3 diethers of the formula:

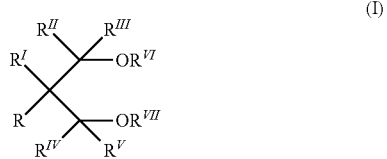

(I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R-$R^V$ except that $R^{VI}$ and $R^{VII}$ cannot be hydrogen. In some embodiments, one or more of the R-$R^{VII}$ groups are linked to form a cycle. In some embodiments, the 1,3-diethers have $R^{VI}$ and $R^{VII}$ selected from $C_1$-$C_4$ alkyl radicals.

In some embodiments, mixtures of donors are used. In some embodiments, the mixtures are made from or contain esters of aliphatic diacids and 1,3 diethers. In some embodiments, the mixtures are selected from mixtures described in Patent Cooperation Treaty Publication No. WO2011/061134.

In some embodiments, the compounds are used in form of pure isomers or in the form of mixtures of enantiomers, or mixture of regioisomers and enantiomers.

In some embodiments, the amount of bidentate electron donor (ID) compound used in the catalyst preparation is such that the Mg/(ID) molar ratio ranges from 1 to 50, alternatively from 2 to 25. In some embodiments, the amount of electron donor compound in the final solid catalyst component ranges from 0.5 to 40 wt % by weight, alternatively from 1 to 35 wt %, with respect to the total weight of the solid catalyst component.

In step (d) the solid particles are then contacted with a titanium halide and then washed with an inert diluent. In some embodiments, the titanium halide is titanium tetrachloride. In some embodiments, the solid particles are contacted with a mixture of titanium tetrachloride and an inert diluent and then washed with an inert diluent. In some embodiments, the titanium halide is used in excess, alternatively in large excess. In some embodiments, the titanium halide is used in amounts ranging from 2 to 50 moles, alternatively 2 to 40 moles, per mole of magnesium. In some embodiments, the treatment temperature ranges from higher than 80° C. to 150° C., alternatively from 90° C. to 130° C. In some embodiments and when a mixture of titanium tetrahalide and inert diluent is used to treat the solid precipitate, the amount of titanium tetrahalide in the treating solution is 10-99 percent by vol., alternatively 20-80 percent, and the rest is an inert diluent.

In some embodiments, the treatment stage with the titanium halide is repeated one or more times under the same conditions. In some embodiments, a bidentate electron donor compound is used in this stage. In some embodiments, the bidentate donor is used, two or more titanium halide treatment stages are carried out, and the donor is added in the first of such stages. In some embodiments, the last of such two or more titanium halide treatment stages is carried out without electron donor compound.

At the end of the treatment stages (d) the solid is further washed with an inert diluent to remove impurities.

In some embodiments and in one or more of the reaction steps (a)-(d), a Bi compound is present.

In some embodiments, the Bi compound does not have Bi-carbon bonds. In some embodiments, the Bi compounds are selected from the group consisting of Bi halides, Bi carbonate, Bi carboxylates, Bi acetate, Bi nitrate, Bi oxide, Bi sulphate, and Bi sulfide. In some embodiments, the Bi compounds have Bi has the valence +3. In some embodiments, the Bi halides are selected from the group consisting of Bi trichloride and Bi tribromide. In some embodiments, the Bi compounds are selected from the group consisting of $BiCl_3$ and Bi decanoate.

In some embodiments, the amount of bismuth compound used in the process ranges from 0.005 to 0.2 mole per mole of Mg, alternatively from 0.010 to 0.1, alternatively from 0.01 to 0.04.

In some embodiments, the Bi compound is added in step (a) and dissolved with magnesium halide in the solvent system.

In some embodiments, the Bi compound is added in step (b). In some embodiments, the Bi compound is dissolved or suspended in the liquid medium made from or containing the Ti compound.

In some embodiments, the Bi compound is added in step (d). In some embodiments, the Bi compound is dissolved or suspended in a liquid medium made from or containing the Ti compound.

In some embodiments, the Bi compound is introduced in more than one step (a)-(d), thereby further enhancing the Bi final amount. In some embodiments, the Bi compound is used in one of the steps (a)-(d).

In some embodiments, the catalyst component (A) is used as a solid or as a suspension.

In some embodiments, the solid catalyst components (A) are converted into catalysts for the polymerization of olefins by reaction with (B) organoaluminum compounds and optionally, (C) one or more external electron-donor compounds.

In some embodiments, the organoaluminum compounds are alkyl-Al compounds. In some embodiments, the alkyl-Al compounds are trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the trialkyl aluminum compounds are used in mixtures with alkylaluminum halides, alkylaluminum hydrides or alkylaluminum sesquichlorides. In some embodiments, the alkylaluminum sesquichlorides are selected from the group consisting of $AlEt_2Cl$ and $Al_2Et_3Cl_3$. In some embodiments and in the catalyst system, the molar ratio of aluminum in component (B) to titanium in component (A) is from 5 to 1000, alternatively from 100 to 800, and the molar ratio of silicon in component (C) to titanium in component (A) is from 2 to 100, alternatively from 5 to 40.

In some embodiments and when polymers having a very high isotactic index are to be produced, an external donor compound is used. In some embodiments, the external donor (C) is the same type as or different from the electron donor compound used in the preparation of the solid catalyst component (A).

In some embodiments, the external donor compounds are selected from silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds have the values where a is 1, b is 1, c is 2, at least one of $R^5$ and $R^6$ is selected from branched alkyl, alkenyl, alkylene, cycloalkyl or aryl groups with 3-10 carbon atoms optionally containing heteroatoms and $R^7$ is a $C_1$-$C_{10}$ alkyl group. In some embodiments, $R^7$ is methyl. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,trifluoropropyl-2-ethylpiperidinyl-dimethoxysilane and 1,1,1,trifluoropropyl-methyl-dimethoxysilane. In some embodiments, the silicon compounds have the values where a is 0, c is 3, $R^6$ is a branched alkyl or cycloalkyl group, optionally containing heteroatoms, and $R^7$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (c) is used in such an amount to give a molar ratio between the organoaluminum compound and the electron donor compound (c) of from 0.1 to 500, alternatively from 1 to 300, alternatively from 3 to 100.

In some embodiments, these catalysts are used in the processes for the polymerization of olefins $CH_2=CHR$, wherein R is hydrogen or a hydrocarbyl radical with 1-12 carbon atoms. In some embodiments, the alpha-olefins for polymerization or copolymerization are selected from the group consisting of ethylene, propylene, butene-1, 4-methyl-1-pentene and hexene-1. In some embodiments, the catalysts are used in the polymerization or copolymerization of propylene and ethylene. In some embodiments, the polymers produced are selected from the group consisting of high density ethylene polymers (HDPE, having a density higher than 0.940 g/cm$^3$), made from or containing ethylene homopolymers and copolymers of ethylene with alpha-olefins having 3-12 carbon atoms; linear low density polyethylenes (LLDPE, having a density lower than 0.940 g/cm$^3$) and very low density and ultra-low density (VLDPE and ULDPE, having a density lower than 0.920 g/cm$^3$, to 0.880 g/cm$^3$ cc) made from or containing copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene between about 30 and 70%, isotactic polypropylenes and crystalline copolymers of propylene and ethylene and/or other alpha-olefins having a content of units derived from propylene higher than 85% by weight (random copolymers); shock resistant polymers of propylene obtained by sequential polymerization of propylene and mixtures of propylene with ethylene, containing up to 30% by weight of ethylene; and copolymers of propylene and 1-butene having a number of units derived from 1-butene between 10 and 40% by weight.

In some embodiments, the polymerization is carried out in slurry using as diluent an inert hydrocarbon solvent or in bulk using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the catalyst is introduced directly into the polymerization reactor. In some embodiments, the catalyst is pre-polymerized before being introduced into the first polymerization reactor. As used herein, the term "pre-polymerized" refers to a catalyst subjected to a polymerization step at a low conversion degree. As used herein, a catalyst is considered to be pre-polymerized when the amount the polymer produced is from about 0.1 up to about 1000 g per gram of solid catalyst component.

In some embodiments, the pre-polymerization is carried out with the alpha olefins selected from the same group of olefins previously described herein. In some embodiments, ethylene or mixtures thereof are pre-polymerized with one or more α-olefins in an amount up to 20% by mole. In some embodiments, the conversion of the pre-polymerized catalyst component is from about 0.2 g up to about 500 g per gram of solid catalyst component.

In some embodiments, the pre-polymerization step is carried out at temperatures from 0 to 80° C., alternatively from 5 to 50° C., in liquid or gas-phase. In some embodiments, the pre-polymerization step is performed in-line as a part of a continuous polymerization process or separately in a batch process. In some embodiments, the batch pre-polymerization of the catalyst with ethylene produces an amount of polymer ranging from 0.5 to 20 g per gram of catalyst component.

In some embodiments, the polymerization is carried out at temperature of from 20 to 120° C., alternatively from 40 to 80° C. In some embodiments and when the polymerization is carried out in gas-phase, the operating pressure is between 0.5 and 10 MPa, alternatively between 1 and 5 MPa. In some embodiments and in bulk polymerization processes, the operating pressure is between 1 and 6 MPa, alternatively between 1.5 and 4 MPa. In some embodiments, hydrogen or other compounds act as chain transfer agents to control the molecular weight of polymer.

The following examples are given in order to better illustrate the disclosure without limiting it.

EXAMPLES

The following examples are given to better illustrate the invention without limiting it.
Characterizations
Determination of Mg, Ti The determination of Mg and Ti content in the solid catalyst component was carried out via inductively coupled plasma emission spectroscopy on "I.C.P Spectrometer ARL Accuris".

The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" apparatus for complete burning. The residue was collected with a 5% v/v $HNO_3$ solution and then analyzed via ICP at the following wavelengths: Magnesium, 279.08 nm; Titanium, 368.52 nm.

Determination of Bi

The determination of Bi content in the solid catalyst component was carried out via inductively coupled plasma emission spectroscopy on "I.C.P Spectrometer ARL Accuris".

The sample was prepared by analytically weighing in a 200 milliliters volumetric flask 0.1-0.3 grams of catalyst. After slow addition of both about 20 milliliters of $H_2SO_4$ 95-98% and about 50 milliliters of distilled water, the sample underwent a digestion for 12 hours. Then the volumetric flask was diluted to the mark with deionized water. The resulting solution was directly analyzed via ICP at the following wavelength: bismuth, 223.06 nm.

Determination of Internal Donor Content

The content of internal donor in the solid catalytic compound was determined by gas chromatography. The solid component was dissolved in acetone, an internal reference was added, and a sample of the organic phase was analyzed in a gas chromatograph, thereby determining the amount of donor present at the starting catalyst compound.

Determination of X.I.

2.5 g of polymer and 250 ml of o-xylene were placed in a round-bottomed flask provided with a cooler and a reflux condenser and kept under nitrogen. The resulting mixture was heated at 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Molecular Weight Distribution (Mw/Mn)

Molecular Weight and Molecular Weight Distribution (MWD) were measured by Gel Permeation Chromatography (GPC) in 1,2,4-trichlorobenzene (TCB). Molecular weight parameters ($\overline{M}_n$, $\overline{M}_w$, $\overline{M}_z$) and molecular weight distributions for the samples were measured using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm and their particle size 13 μm. The mobile phase flow rate was kept at 1.0 mL/min. The measurements were carried out at 150° C. Solution concentrations were 2.0 mg/mL (at 150° C.) and 0.3 g/L of 2,6-di-tertbutyl-p-cresole were added to prevent degradation. For GPC calculation, a universal calibration curve was obtained using 12 polystyrene (PS) standard samples supplied by PolymerChar (peak molecular weights ranging from 266 to 1220000). A third order polynomial fit was used for interpolating the experimental data and obtain the relevant calibration curve. Data acquisition and processing was done by using Empower 3 (Waters).

The Mark-Houwink relationship was used to determine the molecular weight distribution and the relevant average molecular weights: the K values were $K_{PS}=1.21 \times 10^{-4}$ dL/g and $K_{PP}=1.90 \times 10^{-4}$ dL/g for polystyrene (PS) and polypropylene (PP) respectively, while the Mark-Houwink exponents α=0.706 for PS and α=0.725 for PP were used.

Melt Flow Rate (MIL)

The melt flow rate (MIL) of the polymer was determined according to ISO 1133 (230° C., 2.16 Kg).

Examples 1-2

Into a 0.5 L round bottom flask, equipped with a mechanical stirrer, a cooler and a thermometer, 25.3 g of magnesium dichloride, 2.1 g of bismuth (III) chloride, 118 mL of n-decane and 103.8 g of 2-ethylhexyl alcohol were charged at room temperature under nitrogen atmosphere. The reaction mixture was heated at 130° C. and maintained at this temperature for 5.5 h, thereby preparing a homogeneous solution. To this solution, 5.7 g of phthalic anhydride was added. The mixture was stirred at 130° C. for 2 h, thereby dissolving the phthalic anhydride in the homogeneous solution. The homogeneous solution was cooled to room temperature, and 120 mL of the homogeneous solution was added dropwise to 340 mL of titanium tetrachloride kept at −20° C. over a period of 2 h. After completion of the addition, the temperature of the mixed solution was elevated over a period of 3 h to 100° C. The mixture was held at 100° C. for 1 h, then stirring was stopped. The solid product was allowed to settle, and the supernatant liquid was siphoned off at 100° C. After the supernatant was removed, additional fresh TiCl$_4$ (470 mL) was added. While stirring, diisobutyl phthalate was sequentially added into the flask to meet a Mg/donor molar ratio of 10. The temperature was raised to 120° C. and maintained for 1 h. Thereafter, stirring was stopped. The solid product was allowed to settle, and the supernatant liquid was siphoned off at 120° C. After the supernatant was removed, additional fresh TiCl$_4$ (470 mL) was added to reach the initial liquid volume again. The mixture was then heated at 120° C. and maintained at this temperature for 0.5 h. Stirring was stopped again. The solid was allowed to settle, and the supernatant liquid was siphoned off. The solid was washed with n-decane kept at 110° C., then two times with anhydrous heptane at 90° C., three times with hexane in temperature gradient down to 60° C., and one time with hexane at room temperature. The resulting solid was dried under vacuum and analyzed. Both the related composition and propylene polymerization performance are indicated in Table 1.

Comparative Examples C1-C2

Into a 0.5 L round bottom flask, equipped with a mechanical stirrer, a cooler and a thermometer, 25.6 g of magnesium dichloride, 120 mL of n-decane and 105.0 g of 2-ethylhexyl alcohol were charged at room temperature under nitrogen atmosphere. The reaction mixture was heated at 130° C. and maintained at this temperature for 5.0 h, thereby preparing a homogeneous solution. To this solution, 5.7 g of phthalic anhydride was added. The mixture was stirred at 130° C. for 2 h, thereby dissolving the phthalic anhydride in the homogeneous solution. The homogeneous solution was cooled to room temperature, and 120 mL of the homogeneous solution was added dropwise to 340 mL of titanium tetrachloride kept at −20° C. over a period of 2 h. After completion of the addition, the temperature of the mixed solution was elevated over a period of 3 h to 100° C. The mixture was held at 100° C. for 1 h, then stirring was stopped. The solid product was allowed to settle, and the supernatant liquid was siphoned off at 100° C. After the supernatant was removed, additional fresh TiCl$_4$ (470 mL) was added. While stirring, diisobutyl phthalate was sequentially added into the flask to meet a Mg/donor molar ratio of 10. The temperature was raised to 120° C. and maintained for 1 h. Thereafter, stirring was stopped. The solid product was allowed to settle, and the supernatant liquid was siphoned off at 120° C. After the supernatant was removed, additional fresh TiCl$_4$ (470 mL) was added to reach the initial liquid volume again. The mixture was then heated at 120° C. and maintained at this temperature for 0.5 h. Stirring was stopped again. The solid was allowed to settle, and the supernatant liquid was siphoned off. The solid was washed with n-decane kept at 110° C., then two times with anhydrous heptane at 90° C., three times with hexane in temperature gradient down to 60° C., and one time with hexane at room temperature. The resulting solid was dried under vacuum and analyzed. Both the related composition and propylene polymerization performance are indicated in Table 1.

Comparative Examples C3-C4

The catalyst component was prepared according to the procedure described in Examples 1-9 of Patent Cooperation Treaty Publication No. WO2017/042054. Both the related composition and propylene polymerization performance are indicated in Table 1.

General Procedure for the Polymerization of Propylene

A 4-liter steel autoclave equipped with a stirrer, a pressure gauge, a thermometer, a catalyst feeding system, monomer feeding lines and a thermostatic jacket, was purged with nitrogen flow at 70° C. for one hour. A suspension containing 75 ml of anhydrous hexane, 0.76 g of $AlEt_3$ (6.66 mmol), 0.33 mmol of external donor and 0.010 g of solid catalyst component, precontacted for 5 minutes, was charged. Dicyclopentyldimethoxysilane, D donor, or cyclohexylmethyldimethoxysilane, C donor, was used as an external donor as reported in Table 1.

The autoclave was closed and the hydrogen was added (2 NL in D donor tests and 1.5 NL in C donor tests). Then, under stirring, 1.2 kg of liquid propylene was fed. The temperature was raised to 70° C. in about 10 minutes, and the polymerization was carried out at this temperature for 2 hours. At the end of the polymerization, the non-reacted propylene was removed; the polymer was recovered and dried at 70° C. under vacuum for 3 hours. Then the polymer was weighed and characterized.

TABLE 1

| | Solid Catalyst Component | | | | Polymerization | | | | |
|---|---|---|---|---|---|---|---|---|---|
| | Mg % wt. | Ti % wt. | Bi % wt. | DIBP % wt. | ED type | Mileage Kg/g | XI % wt. | MIL g/10' | Mw/Mn | BDP Kg/dm³ |
| Ex. 1 | 21.0 | 1.1 | 1.8 | 6.9 | D | 65.3 | 99.3 | 1.6 | 8.1 | 0.449 |
| Ex. 2 | | | | | C | 53.9 | 98.9 | 4.8 | 7.0 | 0.461 |
| C1 | 20.5 | 2.1 | — | 6.9 | D | 84.6 | 98.7 | 2.0 | 9.8 | 0.434 |
| C2 | | | | | C | 71.4 | 97.8 | 5.2 | 7.6 | 0.401 |
| C3 | 20.0 | 1.0 | 2.2 | 6.9 | D | 64.1 | 99.0 | 2.46 | — | 0.409 |
| C4 | | | | | C | 56.6 | 98.3 | 6.58 | — | 0.424 |

DIBP = diisobutyl phthalate

What is claimed is:

1. A process comprising:
   preparing a solid catalyst component for the polymerization or copolymerization of olefins comprising the steps of:
   (a) dissolving a magnesium halide in a solvent system comprising a first electron donor compound and a liquid hydrocarbon at a temperature higher than 40° C., thereby yielding a solution;
   (b) cooling the solution to a temperature below 40° C. and adding a titanium compound in a molar excess with respect to the magnesium halide;
   (c) raising the temperature of the solution to higher than 70° C., thereby obtaining a solid product; and
   (d) treating the solid product obtained in step (c) with an excess of titanium halide at a temperature higher than 80° C. for one or more times and recovering the solid particles of catalyst component, wherein the catalyst component comprises titanium, bismuth, magnesium, a halogen, and the first electron donor compound,
   wherein
   (i) a second electron donor compound is present in step (c), step (d), or both steps (c) and (d), wherein the second electron donor compound is a bidentate electron donor compound, and
   (ii) a Bi compound is present in one or more of steps (a)-(d).

2. The process according to claim 1, wherein the Bi compound is selected from the group consisting of Bi halides, Bi carbonate, Bi carboxylates, Bi nitrate, Bi oxide, Bi sulphate and Bi sulfide.

3. The process according to claim 2, wherein the Bi compound is Bi trichloride or a Bi decanoate.

4. The process according to claim 1, wherein the Bi compound is present in amounts ranging-from 0.005 to 0.2 mole per mole of Mg.

5. The process according to claim 1, wherein the Bi compound is added in step (a) and dissolved with magnesium halide in the solvent system.

6. The process according to claim 1, wherein the Bi compound is added in step (b) or (d), and dissolved or suspended in a liquid medium comprising the Ti compound.

7. The process according to claim 1, wherein in step (a), after dissolution of the magnesium halide but before carrying out step (b), a dicarboxylic acid anhydride is added to the system.

8. The process according to claim 1, wherein the magnesium halide is magnesium dichloride.

9. The process according to claim 1, wherein the solvent system comprises the first electron donor compound, and wherein the first electron donor compound is selected from the group consisting of aliphatic alcohols having at least 6 carbon atoms, organic epoxy compounds, organic esters of phosphoric acids and mixtures thereof.

10. The process according to claim 1, wherein the titanium compound has the formula $TiX_n(OR)_{4-n}$ wherein X is a halogen, each R is independently a hydrocarbyl group and n is an integer of from 0 to 4.

11. The process according to claim 1, wherein the bidentate electron donor compound is selected from the group consisting of ethers, amines, alkoxysilanes, carbamates, ketones, and esters of aliphatic or aromatic polycarboxylic acids.

12. The process according to claim 11, wherein the bidentate electron donor compound is selected from the group consisting of alkyl and aryl esters of optionally substituted aromatic polycarboxylic acids.

13. The process according to claim 11, wherein the bidentate electron donor compound is selected from mixture of esters of aliphatic diacids and 1,3 diethers.

14. The process according to claim 1 further comprising the step of polymerizing an olefin having the formula, CH2=CHR, wherein R is hydrogen or a hydrocarbyl radical with 1-12 carbon atoms, in the presence of a reaction product resulting from the reaction between (A) the solid catalyst component, (B) an alkylaluminum compound and, optionally, (C) one or more external electron-donor compounds.

* * * * *